United States Patent [19]

Batten

[11] Patent Number: 5,543,064

[45] Date of Patent: *Aug. 6, 1996

[54] SEWAGE LIFT STATION

[75] Inventor: William C. Batten, Asheboro, N.C.

[73] Assignee: Clearline Systems, Inc., Asheboro, N.C.

[*] Notice: The term of this patent shall not extend beyond the expiration date of Pat. No. 5,360,555.

[21] Appl. No.: 301,978

[22] Filed: Sep. 7, 1994

[51] Int. Cl.⁶ ..................................... C02F 1/40
[52] U.S. Cl. ..................... 210/803; 210/521; 210/523; 210/532.1; 210/540
[58] Field of Search .................. 210/803, 800, 210/521, 523, 525, 532, 534, 535, 538, 540, 305, 307, 312

[56] References Cited

U.S. PATENT DOCUMENTS

| 255,086 | 3/1882 | Redmond | 210/307 |
|---|---|---|---|
| 2,468,864 | 5/1949 | Campbell | 210/523 |
| 2,479,386 | 8/1949 | Matheis | 210/540 |
| 2,776,054 | 1/1957 | Hirshstein | 210/540 |
| 2,782,929 | 2/1957 | Colket | 210/540 |
| 3,397,784 | 8/1968 | Carr | 210/108 |
| 3,407,937 | 10/1968 | Bakker et al. | 210/307 |
| 3,469,702 | 9/1969 | Perren | 210/265 |
| 3,731,802 | 5/1973 | James | 210/540 |
| 3,933,654 | 1/1976 | Middelbeek | 210/540 |
| 4,116,835 | 9/1978 | Bertelson | 210/317 |
| 4,119,541 | 10/1978 | Makaya | 210/242.3 |
| 4,145,280 | 3/1979 | Middelbeek et al. | 210/300 |
| 4,149,973 | 4/1979 | Harris | 210/521 |
| 4,400,274 | 8/1983 | Protos | 210/521 |
| 4,802,978 | 2/1989 | Schmitt et al. | 210/521 |
| 4,915,823 | 4/1990 | Hall | 210/521 |
| 4,940,539 | 7/1990 | Weber | 210/538 |
| 5,120,435 | 6/1992 | Fink | 210/521 |
| 5,236,585 | 8/1993 | Fink | 210/538 |
| 5,242,604 | 9/1993 | Young et al. | 210/540 |
| 5,254,267 | 10/1993 | Deskins et al. | 210/538 |
| 5,360,555 | 11/1994 | Batten | 210/521 |
| 5,378,376 | 1/1995 | Zenner | 210/540 |

FOREIGN PATENT DOCUMENTS

| 1484845 | 11/1969 | Germany . |
|---|---|---|
| 55-45243 | 11/1980 | Japan . |
| 392006 | 8/1973 | U.S.S.R. . |

Primary Examiner—Christopher Upton
Attorney, Agent, or Firm—Rhodes Coats & Bennett, L.L.P.

[57] ABSTRACT

A method and apparatus for separating grease from solids and water in a sewage lift station, and separately transferring said grease, and said solids and water, from said station to remote higher destinations, comprising conveying grease from a first chamber to an adjacent second chamber at a first given level, and pumping solids and water from the first chamber from below the first given level to a third chamber; conveying water from the second chamber to the third chamber at a second given level no higher than the first given level, and pumping grease from the second chamber at the second given level to a first, remote, higher destination; and pumping water and solids from the third chamber at below the second given level to a second, remote, higher destination.

17 Claims, 2 Drawing Sheets 5,543,064

SEWAGE LIFT STATION

BACKGROUND OF THE INVENTION

This invention relates to improved sewage lift stations, in which, conventionally, sewage passing through sewage pipes is raised to permit it to flow over hills and on to a sewage treatment plant. In the improved sewage lift station, grease is separated from water and solids in sewage, and thereafter transferred separately to remote destinations.

Sewage lift stations, usually comprise rectangular tanks made of precast concrete that are buried below ground A conduit having an inlet end communicates with the interior of the tank and a discharge end at a remote location. A pump, which may be submerged in the tank, pumps sewage from the tank upwardly to a remote destination.

In the tank, any grease in the sewage, being of a lower density than the water in the sewage, rises to the top, forming a separate grease mat layer. The amount of grease in the tank tends to build up over time, since the grease is at the top of the tank, and the pump is usually at the bottom of the tank, resulting in difficulty in evacuating the tank, as well as clogging of the pump and conduit when it is subjected to pumping the grease mat. Periodically, the entire contents of the tank, or the grease along with part of the water, is pumped from the tank.

The prior art discloses various methods and apparatus for separating two immiscible liquids, and also discloses various methods and apparatus for removing one liquid from contact with the other after separation of the liquids into two layers in a separator. For example, in some cases, the lighter liquid is discharged by gravity from the separator through an upper pipe and the heavier liquid is discharged from the separator through a lower pipe. Generally, the methods and apparatus relate to the separation of grease or oil from water.

U.S. Pat. No. 4,400,274 to Protos, describes a gravity separator in which solids are removed prior to separation of the grease and water. In the Protos apparatus, solids and liquids flow by gravity into a first tank. When the tank is filled, grease, which floats to the top of the tank, spills over into a second tank. When the second tank is filled, grease is discharged by gravity from the upper part of the tank, and water is discharged from the bottom part of the tank into a third tank, from whence the water is discharged through gravity flow through a discharge pipe. A vertical screen is present in the first tank to filter grease flowing into the second tank.

U.S. Pat. No. 2,747,736 to Mobley describes a device for removing grease from waste water in a separator, in which grease which floats to the top of the separator is removed by hydrostatic forces. The grease is then stored at a collecting and storage point remote from the separator.

U.S. Pat. No. 5,236,585 to Fink describes a separator in which oil and water are separated. The oil, which floats to the top of the water, flows under gravity to a second separator, where remaining oil is removed, e.g., by filtration. Water is removed from the bottom of the first separator.

Other patents show similar devices. U.S. Pat. No. 4,915,823 to Hall, describes a device for separating oil from water in bilge discharges. After separation, the oil and water are removed through separate discharge pipes. U.S. Pat. No. 4,119,541 to Makaya, discloses a similar arrangement for cleaning up oil spills by separating oil from sea water.

The apparatuses disclosed in the prior art are not used in sewage lift stations in which there is a need to transfer the sewage components to remote destinations, which are located above the lift station, and normally above-ground. In these instance, what is needed is an apparatus which can separate grease from solids and water so as to prevent fouling of the sewage lift pump before transfer of these sewage components to remote destinations above the lift station.

SUMMARY OF THE INVENTION

This need is fulfilled by the sewage lift station of the present invention which comprises a solids separation chamber for separation of solids from the grease and water; a grease separation chamber for separating grease from water; and a sewage lift chamber for receiving water and solids from the solids separation chamber, and water from the grease separation chamber. As used herein "grease" may include oils and other lighter than water liquids commonly found in grease traps or otherwise found in sewage.

The apparatus further comprises a solids transfer conveyor for transferring solids from the solids separation chamber to a remote location above the lift station, the solids transfer conveyor including a pump within the solids separation chamber, and a conduit having an inlet end in communication with the pump and an outlet end in communication with the sewage lift chamber; a grease transfer conveyor for transferring grease from the grease transfer station to a remote higher destination, the grease transfer conveyor comprising a skimmer within the grease separation chamber, a conduit having an inlet end in communication with the skimmer and an outlet end in communication with a remote destination, and a pump to convey grease through the conduit; and a solids and water transfer conveyor for transferring solids and water from the sewage lift chamber to a remote destination, the solids and water transfer conveyor comprising a pump within the sewage lift chamber, and a conduit having an inlet end in communication with the pump and an outlet end in communication with a remote destination.

In addition to the above positive action transfer conveyors, the apparatus is constructed in a manner such that grease is conveyed by gravity from the top of the solids separation chamber into the grease separation chamber. Also, water is conveyed by gravity from the grease separation chamber to the sewage lift chamber by way of a conduit having an inlet end in the lower part of the grease separation chamber, and an outlet end discharging into the sewage lift chamber.

More specifically, the apparatus is comprised of a solids separation chamber having a rear wall, side walls, a front wall, and a bottom wall connecting the rear, side and front walls. A sewage inlet connecting the solids separation chamber to a remote source of sewage by way of a pipe is located in the rear or another wall. The front wall has an upper edge at a given level below the upper edges of the rear and side walls. As a result, grease, which rises to the top of the solids separation chamber, flows over the upper edge of the chamber's front wall. Solids, being heavier than the water, settle to the bottom of the chamber. Baffles are placed in the bottom of the chamber to concentrate the solids in the vicinity of the pump used to remove the solids. To ensure that the solids remain in the chamber, a screen extends horizontally between the chamber's walls above the sewage inlet to prevent solids from flowing over the front wall.

The solids separation chamber is adjacent a grease separation chamber with the rear wall of the grease separation chamber being common with the front wall of the solids separation chamber. The grease separation chamber also includes side walls, a front wall, and a bottom wall joining the side and front walls, with the side and front walls being of a height greater than the rear wall of the chamber. In addition, the grease separation chamber includes a baffle extending between the side walls and spaced from the chamber's rear wall, i.e., the front wall of the solids separation chamber. The baffle includes an upper edge at a level above the level of the upper edge of the rear wall and a lower edge at a level below the level of the upper edge of the rear wall.

The grease separation chamber is adjoined to a sewage lift chamber having a rear wall common with the front wall of the grease separation chamber, side walls and a front wall.

A water conduit for conveying water from the grease separation chamber to the sewage lift chamber extends through the rear wall of the sewage lift chamber, and has an inlet end in the lower part of the grease separation chamber, and an outlet end in the upper part of the sewage lift chamber.

Solids are transferred from the solids separation chamber to the sewage lift chamber by a solids transfer conveyor comprising a pump within the solids separation chamber, and a conduit having an inlet end connected to the pump and an outlet end opening into the sewage lift chamber. Baffles are positioned in the bottom of the chamber to concentrate solids in the vicinity of the pump.

As is conventional with grease traps and other holding tanks holding a mixture of immiscible liquids, the lighter liquid "floats" on top of the heavier, or denser, liquid. Thus grease in the grease separation chamber forms an upper grease layer floating on water.

Grease is transferred from the upper portion of the grease separation chamber to a remote higher location by a grease transfer conveyor comprising a grease skimmer located in the upper part of the grease separation chamber; a conduit having in inlet end communicating with the skimmer and a discharge end at a remote location; and a pump adapted to convey grease from the skimmer, through the conduit, to the remote destination.

The skimmer, which is located at a given level at or below the level of the upper edge of the front wall of the solids separation chamber, is preferably of a type described in detail in co-pending application Ser. No. 08/149,182, filed Nov. 8, 1992, the entire disclosure of which is hereby incorporated by reference. Basically, the skimmer described in the aforesaid application has an upwardly opening grease inlet to receive grease rising above the level of the skimmer. Air is injected into the skimmer to close a swing check valve and propel the grease from the skimmer through a conduit.

However, the skimmer may be of a different configuration. For example, skimmers of the types shown in U.S. Pat. Nos. 3,769,207 to Baer; 3,693,805 to Tillett et al; 4,264,450 to Ayers et al; and 4,235,726 to Shimko; may be used. Water and solids are transferred from the sewage lift chamber to a remote destination, by a sewage lift conveyor comprised of a pump within the sewage lift chamber, and a conduit having an inlet end connected to the pump and an outlet end at a remote destination.

In use, sewage made up of grease, water and solids is conveyed from a remote source to the solids separation chamber, in which grease rises to the top of the chamber, while solids fall to the bottom. When the level of sewage in the container reaches the top of the chamber's front wall, the grease, as well as some of the water, spills over the wall into the grease separation chamber.

In the grease separation chamber, grease rises to the top of the chamber. When the water level reaches the level of the opening for the conduit in the front wall of the chamber, water flows through the water conduit into the sewage lift chamber.

Periodically, either in response to a timer or a sensor, solids and water in the solids separation chamber are pumped into the sewage lift station. Also periodically, grease is skimmed from the top of the grease separation chamber and pumped to a first, remote, higher destination, and solids and water are pumped from the sewage lift chamber to a second, remote, higher location, such as a regular sewage drain. These steps may occur simultaneously, or at different times.

While the invention is described in terms of the separation of grease from water, it will be apparent that the apparatus and method described herein are generally useful in the separation of two immiscible liquids.

DETAILED DESCRIPTION OF THE PREFERRED EMBODIMENT

Figure 1:
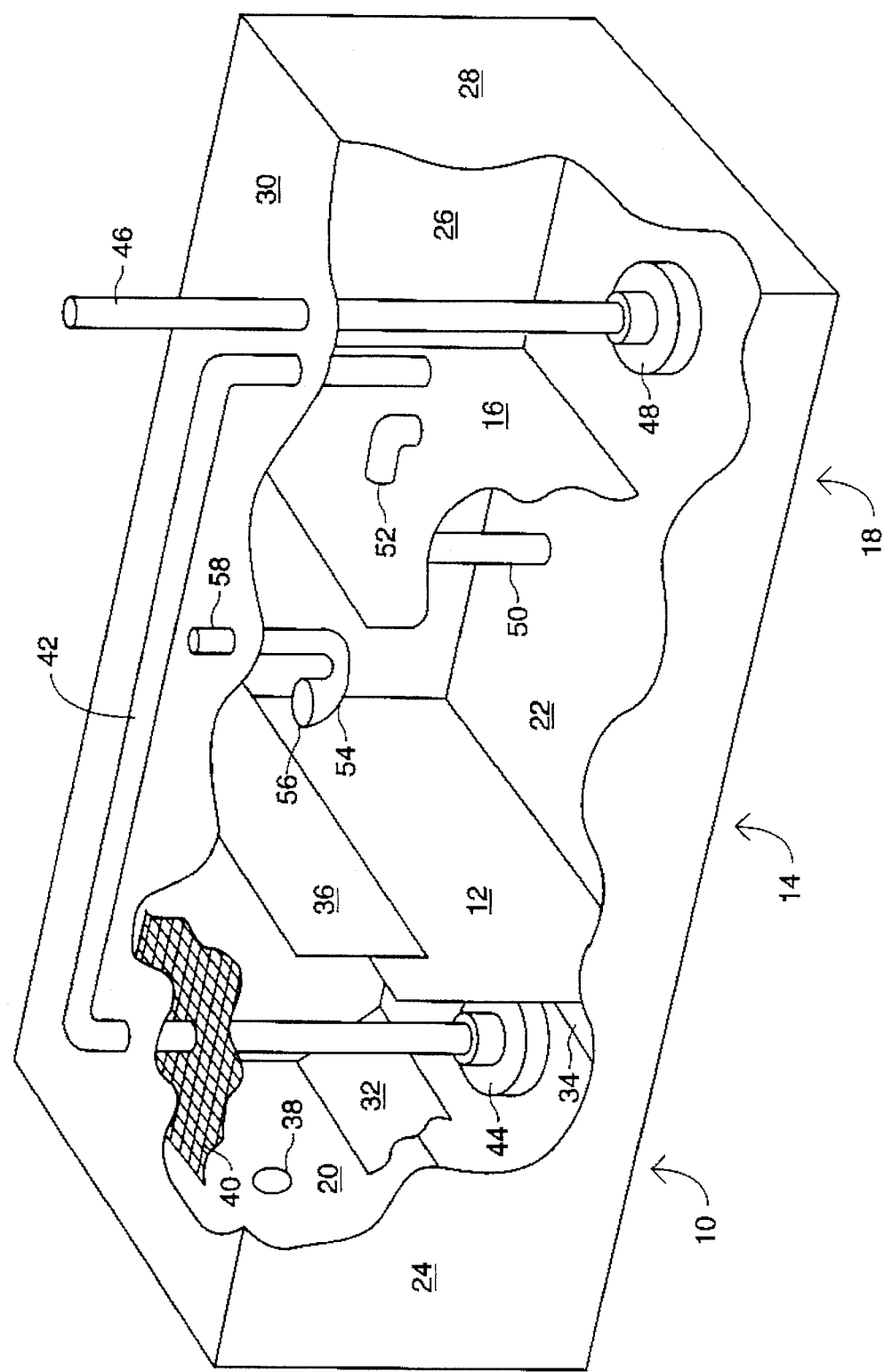
FIG. 1 is a schematic, perspective view of the apparatus with sections cut away for clarity.
Figure 2:
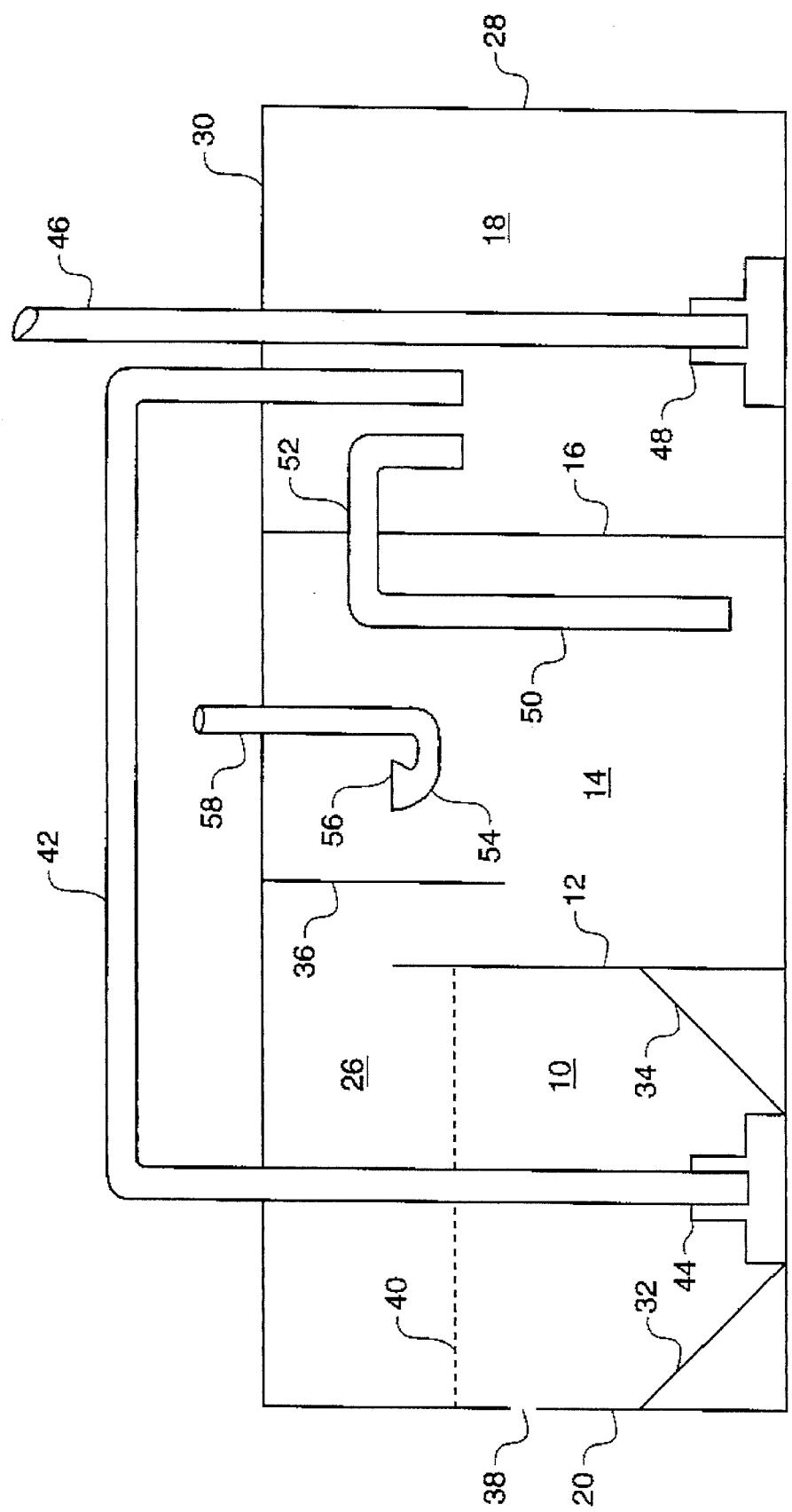
FIG. 2 is a schematic, side view of the apparatus.

The preferred embodiment of the present invention comprises a solids separation chamber, generally 10, having a front wall 12, which also forms the rear wall of a grease separation chamber, generally 14. Chamber 14 also has a front wall 16, which additionally forms the rear wall of a sewage lift chamber, generally 18.

The aforesaid chambers are enclosed by a rear wall 20, which forms the rear wall of chamber 10, a common bottom wall 22, common side walls 24 and 26, and a front wall 28, which also forms the front wall of chamber 18. The chambers are covered by a common cover 30. Front wall 12 has an upper edge lower than the edges of walls 16, 20, 24 and 26.

Chamber 10 also include baffles 32 and 34 which extend downwardly from walls 20 and 12, respectively, to bottom wall 22. Chamber 14 includes a baffle 36 which extends between side walls 24 and 26 and in front of wall 12. The upper edge of baffle 36 is at a level above the level of the upper edge of wall 12, and its lower edge is at a level below the edge of the level of front wall 12. Rear wall 20 includes a sewage inlet 38 which is attached to the end of a discharge pipe, not shown, through which sewage flows from a remote source. A horizontal screen 40 is positioned across chamber 10 above inlet 38 and below the upper edge of wall 12.

A conduit 42 extends from the bottom of chamber 10, where the inlet end of conduit 42 is connected to a submerged pump 44, to a discharge end in the upper part of chamber 18. A second conduit 46 extends from an inlet end connected to a submerged pump 48 in chamber 18 to a first, remote, higher destination. A water conduit 50 extends from an inlet end in the lower part of chamber 14 through an opening 52 in wall 16, to a discharge end in the upper part of chamber 18. The level of opening 52 is the same as, or below, the level of the upper edge of wall 12.

A skimmer 54 having an intake 56 positioned at a level with opening 52 is mounted in the upper part of chamber 14, and is connected to the inlet end of a conduit 58, which extends to an outlet end at a second, remote, higher destination. Conduit 58 may also communicate with a remote pump, not shown. Preferably, the skimmer is as disclosed in the aforementioned patent application Ser. No. 08/149,182, filed Nov. 8, 1992, which acts to pump as well as skim.

In operation, sewage, made up of grease, water and solids conveyed from a remote source, enters solids separation chamber 10 through inlet 38. Grease, rising to the top of chamber 10, spills over the upper edge of wall 12 into grease separation chamber 14, while solids, prevented from spilling from chamber 10 by screen 40, fall to the bottom of chamber 10, where the solids are concentrated by baffles 32 and 34.

In chamber 14, grease rises to the top of the chamber. When the water level reaches the level of opening 52 in wall 16, water flows through water conduit 50 into sewage lift chamber 18.

periodically, either in response to a timer or a sensor, solids and water in chamber 10 are pumped into chamber 18 by pump 44. Also periodically, grease is skimmed from the top of chamber 14 with skimmer 54 and pumped to a first, remote, higher destination. As is conventional, solids and water are pumped from chamber 18 to a second, remote, higher location free of grease. These steps may occur simultaneously, or at different times.

Certain modifications and improvements will occur to those skilled in the art upon a reading of the foregoing description. By way of example, conduit 42 may connect directly into conduit 46. Also, different shaped chambers may be used, and the sewage lift chamber may be spaced from the grease separation chamber. It should be understood that all such modifications and improvements have been deleted herein for the sake of conciseness and readability but are properly within the scope of the follow claims. For greater solids separation area, an arrangement of vertically oriented filter bags may be utilized.

What is claimed is:

1. An underground sewage lift station comprising
   (a) a solids separation chamber having a sewage inlet, and a grease discharge outlet;
   (b) a grease separation chamber in communication with said grease discharge outlet to receive grease from said solids separation chamber;
   (c) a sewage lift chamber;
   (d) a water conduit having an inlet end communicating with said grease separation chamber, and an outlet end communicating with said sewage lift chamber;
   (e) a grease transfer conveyor having an inlet end communicating with said grease separation chamber and an outlet end communicating with a first, remote, higher destination;
   (f) a solids transfer conveyor having an inlet end communicating with said solids separation chamber and an outlet end communicating with said sewage lift chamber; and
   (g) a sewage lift conveyor having an inlet end communicating with said sewage lift chamber and an outlet end communicating with a second, remote, higher destination.

2. The apparatus of claim 1, wherein said solids transfer conveyor comprises a pump within said solids separation chamber, and a conduit having an inlet end connected to said pump and an outlet end opening into said sewage lift chamber.

3. The apparatus of claim 1, wherein said sewage lift conveyor comprises a pump within said sewage lift chamber, and a conduit having an inlet end connected to said pump and an outlet end at a remote destination.

4. The apparatus of claim 1, wherein said solids separation chamber includes a baffle to concentrate solids in the vicinity of said pump.

5. The apparatus of claim 1, wherein said water conduit has an inlet end in the lower part of said grease separation chamber and an outlet end in the upper part of said sewage lift chamber.

6. The apparatus of claim 1, wherein said grease transfer conveyor includes a grease skimmer in the upper part of said grease separation chamber, a conduit extending from said skimmer to said remote destination, and a pump for conveying grease from said skimmer, through said conduit to said remote destination.

7. A sewage lift station comprising
   (a) a solids separation chamber having a rear wall, side walls, and a front wall having a height less than the height of said rear and side walls, said chamber having a sewage inlet in a wall other than said front wall;
   (b) a grease separation chamber having a rear wall common with the front wall of said solids separation chamber, side walls, and a front wall;
   (c) a sewage lift chamber having a rear wall common with the front wall of said grease separation chamber, side walls and a front wall;
   (d) a water conduit having an inlet end in the lower part of said grease separation chamber, and an outlet end in the upper part of said sewage lift chamber;
   (e) a grease transfer conveyor, said grease transfer conveyor comprising a grease skimmer located in the upper part of said grease separation chamber, a conduit having in inlet end communicating with said skimmer and a discharge end at a first, remote, higher destination; and a pump in communication with said conduit to convey grease from said skimmer, through said conduit to said first, remote, higher destination;
   (f) a solids transfer conveyor comprising a pump within said solids separation chamber, and a conduit having an inlet end connected to said pump and an outlet end opening into said sewage lift chamber; and
   (g) a sewage lift conveyor comprises a pump within said sewage lift chamber, and a conduit having an inlet end connected to said pump and an outlet end at a second, remote, higher destination.

8. The apparatus of claim 7, wherein said grease separation chamber includes a baffle extending across said chamber between said side walls, said baffle being positioned between the front wall of said solids separation chamber and said skimmer.

9. The apparatus of claim 7, further including a solids retention screen extending between the walls of said solids separation chamber above said sewage inlet.

10. The apparatus of claim 7, wherein said water conduit extends through the front wall of said grease separation chamber at a given height, said front wall of said solids separation chamber extends above said given height, and said skimmer is at said given height is said grease separation chamber.

11. A method of operating a sewage lift station comprising
   (a) conveying sewage comprised of grease, water and solids to a first chamber;
   (b) conveying grease from said first chamber to a second chamber, and pumping solids and water from said first chamber to a third chamber;
   (c) pumping grease from said second chamber to a first, remote, higher destination, and conveying water from said second chamber to said third chamber; and
   (d) pumping water and solids from said third chamber to a second, remote, higher destination.

12. The method of claim 11, wherein said sewage is conveyed to the upper part of said first chamber.

13. The method of claim 11, wherein said solids are pumped from the bottom section of said first chamber.

14. The method of claim 11, wherein said grease is pumped from the upper part of said second chamber.

15. The method of claim 11, wherein said water is conveyed from the bottom part of said second chamber.

16. The method of claim 11, wherein said water and solids are pumped from the bottom part of said third chamber.

17. A method of operating a sewage lift station comprising (a) conveying sewage comprised of grease, water and solids to a first chamber;

(b) conveying grease from said first chamber to an adjacent second chamber at a first given level, and pumping solids and water from said first chamber from below said first given level to a third chamber;

(c) conveying water form said second chamber to said third chamber at a second given level no higher than said first given level, and pumping grease from said second chamber at said second given level to a first, remote, higher destination; and (d) pumping water and solids from said third chamber at below said second given level to a second, remote, higher destination.

\* \* \* \* \*